(12) United States Patent
Sipe

(10) Patent No.: US 7,931,244 B1
(45) Date of Patent: Apr. 26, 2011

(54) DEVICE FOR EQUIDISTANT BRACKETING OF FIXTURES

(76) Inventor: Mark Evan Sipe, Only, TN (US)

( * ) Notice: Subject to any disclaimer, the term of this patent is extended or adjusted under 35 U.S.C. 154(b) by 645 days.

(21) Appl. No.: 12/077,240

(22) Filed: Mar. 18, 2008

(51) Int. Cl.
*A47B 96/06* (2006.01)
*E04G 3/00* (2006.01)
*E04G 25/00* (2006.01)
*E04G 5/06* (2006.01)
*F16B 1/00* (2006.01)
*G09F 7/18* (2006.01)
*B05B 15/06* (2006.01)
*F16L 3/00* (2006.01)
*A47G 29/00* (2006.01)
*F21V 21/00* (2006.01)
*F21V 35/00* (2006.01)
*A47F 1/04* (2006.01)
*A47F 7/00* (2006.01)

(52) U.S. Cl. ........ 248/229.2; 248/73; 248/49; 248/74.1; 248/200.1; 248/214; 248/226.11; 248/227.2; 248/227.3; 211/60.1; 411/84

(58) Field of Classification Search .............. 248/229.2, 248/69, 73, 49, 57, 74.1, 74.3, 74.4, 200.1, 248/200, 214, 218, 226.11, 227.2, 227.3, 248/228.6, 230.3, 231.71, 228.7, 230.7; 211/60.1; 411/84

See application file for complete search history.

(56) References Cited

U.S. PATENT DOCUMENTS

| | | | |
|---|---|---|---|
| 3,097,843 A | 7/1963 | Morrow | |
| 4,638,965 A * | 1/1987 | De Bruine et al. | 248/59 |
| 4,998,691 A * | 3/1991 | Brown | 248/74.1 |
| 5,060,892 A | 10/1991 | Dougherty | |
| 5,133,094 A | 7/1992 | Clarke, Jr. | |
| 5,154,375 A | 10/1992 | Condon | |
| 5,303,887 A | 4/1994 | Hasty et al. | |
| 5,405,111 A | 4/1995 | Medlin, Jr. | |
| 5,529,269 A * | 6/1996 | Kurmis | 248/68.1 |
| 5,934,631 A * | 8/1999 | Becker et al. | 248/200.1 |
| 6,296,211 B1 | 10/2001 | Snyder | |
| 6,402,096 B1 * | 6/2002 | Ismert et al. | 248/68.1 |
| 6,666,419 B1 | 12/2003 | Vrame | |
| 6,957,515 B1 * | 10/2005 | Hatfield | 52/127.2 |
| 7,039,965 B1 | 5/2006 | Ismert | |
| 7,694,917 B2 * | 4/2010 | Gabriel | 248/49 |
| 2006/0027715 A1 * | 2/2006 | Dinh et al. | 248/65 |
| 2007/0108351 A1 * | 5/2007 | Gatta | 248/56 |

* cited by examiner

*Primary Examiner* — Terrell Mckinnon
*Assistant Examiner* — Christopher Garft
(74) *Attorney, Agent, or Firm* — David D. Winters; Winters Patent Law

(57) ABSTRACT

A device for equidistant mounting of fixtures with bracket rails, axles, mounting brackets, and fixture clamp assembly.

4 Claims, 4 Drawing Sheets

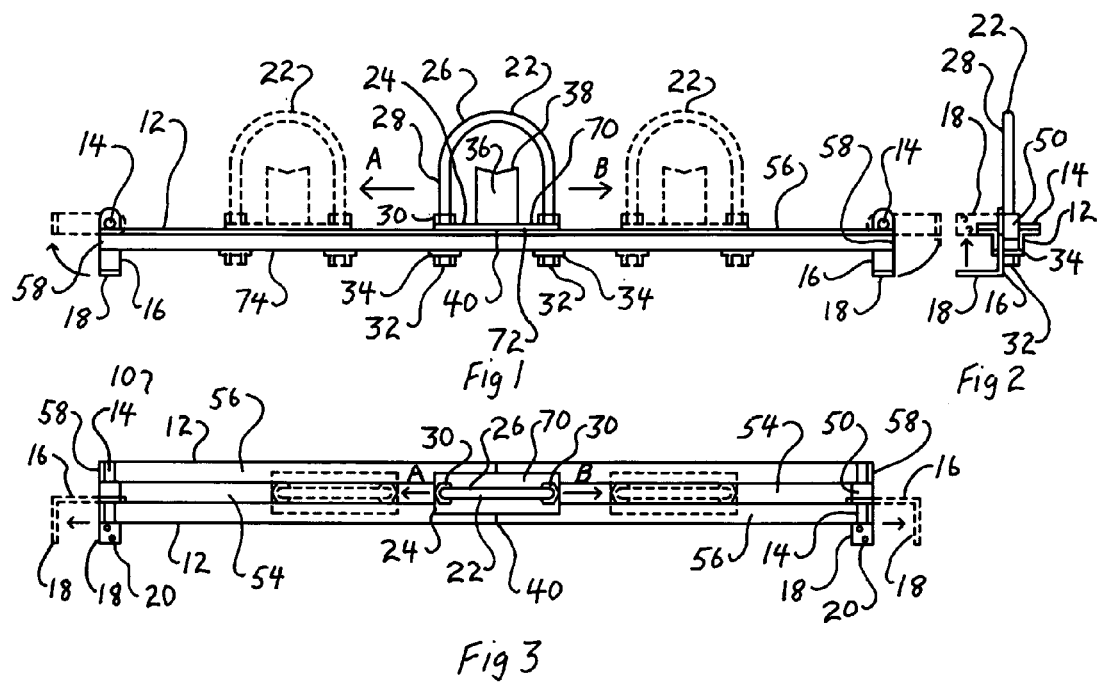
Fig 1
Fig 2
Fig 3
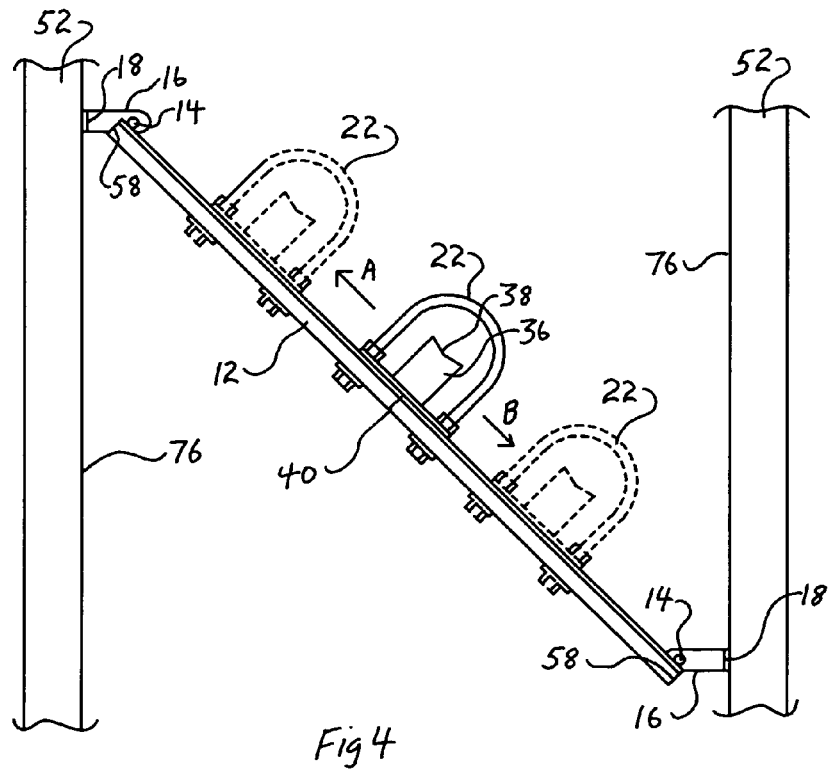
Fig 4

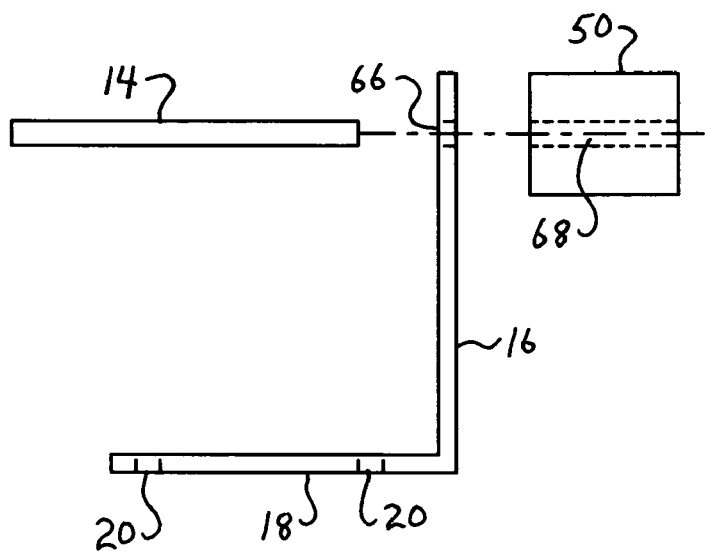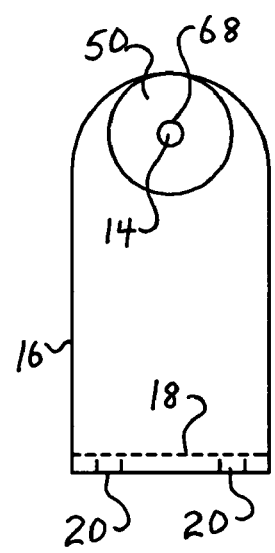
Fig 8
Fig 9

DEVICE FOR EQUIDISTANT BRACKETING OF FIXTURES

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of construction finishing and more specifically to a machine for equidistant bracketing of fixtures.

Most buildings usually require elements such as water, electricity, air, or natural gas to be conveyed through empty spaces between building frame elements, studs, rafters, joists, and the like, and through opposing surfaces, such as walls, floors, ceilings, etc., attached to the outer edges of the frame elements.

This conveyance is usually accomplished through penetration of these surfaces by devices such as vents, registers, electrical outlets, spigots, shower heads, faucets, etc. In association with these, devices which regulate the rate of element delivery and/or output must also be fixed in manually accessible dispositions.

Such regulator devices, especially valves for tubs, showers, and the like, may be supported between frame elements by specialized brackets such that a portion of the regulator device may pass through an opening in one of the opposing surfaces. Often, as in the case of mixing valves for a bath tub and shower combination, it is desirable that such regulator devices be positioned equidistant between supporting structures.

It is also desirable that a portion of the devices, such as a face, be oriented flush with the surface of a wall, so positioned that a stem portion extends out from said wall. To this stem portion, knobs or the like may affixed for manual operation of the regulating device. Also, it is desirable that, when thusly supported, space be available to allow construction or maintenance access.

In previous technology, U.S. Pat. No. 5,133,094 by Clarke, Jr. discloses a mounting fixture for positioning a tub and/or shower valve assembly inside a stud wall. The mounting fixture includes a pair of L-shaped brackets having rows of holes in long flanges, for securing the brackets to the faces of studs, and slots formed in short flanges of the brackets. Clamp assemblies are attached to the short flanges through guides that operate in communication with the slots.

A disadvantage of Clark, in contrast to the instant art, is that Clarke requires a plurality of elements which must either by assembled before installation or installed one element at a time. The instant art is utilizes a single, unitary unit that is mounted as a single piece. Further, Clarke, Jr., teaches no means to fixedly determine the center point between studs, nor to orient any device thereto. In this, the instant art enjoys an advantage over Clarke in that these functions are an inherent capability of the instant art.

A further disadvantage of Clarke, Jr. relative to the instant art, is that the brackets must be attached to the faces of the studs such that the brackets will interfere with attachment of necessary wall boards to the stud faces. The instant art requires no such interference with the stud faces.

U.S. Pat. No. 6,666,419 by Vrame discloses a bracket assembly for mounting a fixture between two building studs. The bracket assembly, requires a first bracket and a second bracket each bracket comprising a mounting base and each bracket having two parallel legs communicating such that the bracket assembly must telescope such that its length may be adjusted to conform to the distance between studs. The instant art performs its task without requiring any such telescoping paraphernalia or length adjustment function.

Vrame also teaches an element not integral to the bracket assembly, which communicates with the fixture to be mounted, in order to create a clamping force between the fixture to be mounted and said non-integral element to bracket assembly, thusly securing the fixture in desired position. Advantageously, no such additional gizmo is required in the much simpler instant art. In additional contrast, Vrame teaches attachment of the bracket assembly to the outer edges of studs. This is a disadvantage relative to the instant art in that such attachments must necessarily interfere with the attachment of wall boards or surfaces to these same stud outer edges. The instant art requires no such attachments to the stud outer edges.

In additional contrast, Vrame teaches no means to fixedly determine and occupy the center point between two studs as does the instant art. The instant art includes this center point determination capability as inherent to its design.

U.S. Pat. No. 5,405,111 by Medlin, Jr. discloses a bracket with a cross member having end portions that extend approximately 90 degrees from the cross member and then bend a further approximately 90 degrees, such that a portion of an end piece is in contact with an inside face of a stud, and a portion of the end piece contacts the outer edge of the stud. To adjust the length of the bracket in order, as may be required, to fit the device between variously spaced studs, an end portion is slidably attached to a cross member. But, in order to fit in its assigned space, once the sliding portion is adjusted, an excess portion of the cross member extending beyond the end part must be removed. Then in order to properly adjust the fitting depth (that is the distance from the outer edge of the stud to the cross member) the bent end portion must be straightened and re-bent at a different point. Finally, to attach the fixture to the bracket, fixed-position holes, that must be compatibly positioned, are provided in the cross member. These holes inherently allow only incremental positioning of the fixture involved.

In contrast to Medlin, Jr. the instant art, significantly less complex, neither teaches nor requires any element slidably communicating with any other element or the removal of any portion of any member in order to accommodate different stud spacings. In additional contrast, the instant art neither teaches nor requires the alteration of any element in order to vary the depth at which any fixture is mounted. In further contrast, the instant art does not require fixed-position holes in any element in order to accomplish the holding of any fixture. In still additional contrast to the instant art Medlin, Jr., as mentioned above, limits the positions in which a fixture is held to particular locations corresponding to the holes in the cross member so that if the fixture is to be moved, it can only be moved in increments determined by the distances between said holes, whereas the instant art allows a fixture to be moved any distance. Also, the instant art comprises means to fixedly determine the mid point between studs while Medlin, Jr. does not.

U.S. Pat. No. 5,154,375 by Condon discloses a pipe hanging device having a substantially annular central clamp portion which has a gap such that the clamp portion may be cinched around an element. Extending from the clamp portion are mounting platforms having holes. In use, a fixture is placed through the clamp portion, the holes in the mounting platform are aligned with holes in a cross member, and mounting pegs are extended through the hole pairs. In the process, the whole must be distended to accomplish said alignment of corresponding holes, which deformation causes the clamp portion to be cinched about the fixture.

In contrast to Condon, the instant art neither teaches nor requires any contrivance or combination of elements to accomplish the deformation of any element in order to cause holding force for any fixture. In additional contrast, the instant art is not limited to a cross member having holes. In further contrast, the instant art provides means to fixedly mark the center point between supporting elements.

U.S. Pat. No. 3,097,843 by Morrow discloses a position maintaining structure for supporting pipes leading to a fixture. The structure comprises a cross member with means to be clamped to a waste water pipe and having uprights extending from the ends of said cross member which support a second cross member having a plurality of holes through which pipes may be passed where they are supported and held in a particular position.

In contrast to Morrow, the instant art does not require a waste water pipe for support but is supported between building elements. In additional contrast, the position in which a fixture is held by the instant art is not limited to the locations of holes through a cross member but is infinitely variable. In yet further contrast, the instant art provides means to fixedly mark the mid point between two supporting structures.

U.S. Pat. No. 7,039,965 B1 by Ismert teaches a plumbing support bracket for supporting plumbing pipes between structural members having a substantially rigid planar center section and end sections that may be bent. Ismert further teaches notches and holes in the center section to support fixtures laid in said notches and/or passed through said holes.

In contrast to Ismert, the instant art neither teaches nor requires one portion of a cross member to be more rigid than another portion nor for any element to be bent. In additional contrast, the instant art neither teaches nor requires holes or notches in a cross member in order to support any elements. In additional yet additional contrast, the positioning of fixtures supported is limited by Ismert to the positioning of holes and notches in the cross member while the positions of fixtures held by the instant art is infinitely variable. Also, the instant art provides means to fixedly mark the center point between two supporting members while Ismert does not.

U.S. Pat. No. 6,402,096 B1 by Ismert et al. discloses a plumbing slider bracket which extends between studs to support fixtures. The bracket has two sections telescopically communicating with other, each section having flexible end tabs by which the bracket is attached to the studs. The slider bracket comprises a channel having a flexible insert and a clamping assembly which travels in the channel. The clamping assembly has distensible uprights that exert pressure on a ratcheting cross piece to hold the cross piece fast against a fixture, thus holding it in place while at the same time forcing ends of the uprights against the flexible insert to hold the clamping assembly in place. When the uprights are pulled together, the ratcheting element may be adjusted and the clamping assembly may be moved in the channel.

In contrast to and advantage over Ismert et al., the instant art neither teaches nor requires any telescoping elements nor any distensible elements to create holding force, either for a clamp assembly or a fixture. In additional contrast and advantage, the instant art comprises no flexible channel insert and neither teaches nor requires flexible end tabs or any other flexible component. In further contrast and advantage, the instant art inherently comprises means to fixedly locate and occupy the mid point between studs while Ismert et al. does not.

U.S. Pat. No. 5,303,887 by Hasty, deceased, et al. discloses a universal pipe support and hanger system comprising a support member of generally L-shape, having opposing flanges which support a central web. The flanges have a plurality of V-Shaped recesses on opposite sides that form cradles in which pipes may rest and be secured by connective devices communicating with the web. One end is configured to either be attached to a flat surface by means of nails or screws or the like, or to be strapped to an annular or arcuate surface such as a pipe. The other end is configured to dovetail with a corresponding end of an associated device.

In contrast to Hasty, deceased, et al., the instant art is not limited to L-shaped support members, and does not require flanges or a central web. Neither does the instant art teach or require a plurality of essentially V-Shaped cradles, as does Hasty. In further contrast, the instant art does not teach or require ends of different configurations for different purposes but instead teaches symmetrical or identical ends for substantially any use to which the device is put. In yet additional contrast, the instant art inherently provides means to fixedly mark and install fittings at the mid point between two surfaces, a characteristic which Hasty lacks.

U.S. Pat. No. 5,060,892 by Dougherty discloses a plumbing hanger bracket assembly for water pipes having a pair of telescopic bracket sections formed with end flanges for attachment to vertical studs of a building. Each bracket section has openings through which pipes may extend, and a sleeve section with a hole, which may slide in the bracket to align the hole with any of above bracket openings for a pipe to pass through to provide additional strength or support.

In contrast to Dougherty, the instant art requires no telescoping elements, nor holes in a bracket through which pipes may extend, nor sliding elements to reinforce any hole. In addition, the holes in the telescoping sections of Dougherty must align where said sections overlap or pipes may not be extended therethrough, therefore, adjustment can only be incremental. Thus occasions may arise where, due to the distance between studs, a portion of Dougherty is not usable. This restricts the positions between studs wherein a pipe may be placed. Also, since Dougherty will only support a pipe where a hole is placed, the positions between studs where a pipe may be placed are further limited. The instant art has no such limitations but provides means to support a fixture at any position between studs. In further contrast to Dougherty, the instant art provides means to fixedly locate and install fittings at the mid point between studs, a characteristic which Dougherty lacks.

U.S. Pat. No. 6,296,211 B1 by Snyder teaches a mounting bracket for supporting fixtures between supporting elements. Snyder has a substantially elongate center portion with channels in either end. Within the channels, rods may slide (telescope) and/or rotate. The rods extend from the center'portion where they bend at essentially 90 degree angles, then bend again at essentially 90 degree angles, providing offsets which may be hammered to drive their pointed ends into supports.

In contrast to Snyder, the instant art teaches no telescoping elements nor any element which must be hit and driven into a support. In additional contrast, the instant art provides means to fixedly mark the mid point between supporting structures.

BRIEF SUMMARY OF THE INVENTION

The primary object of the invention is to provide a fixture mounting device having the ability to establish equidistant orientation and fixation between studs for a fixture without taking prior measurements, regardless of the distance between studs.

Another object of the invention is to provide a fixture mounting device that inherently facilitates orientation of a fixture face parallel to a given plane, in example, the surface of a wall.

Another object of the invention is to provide a mounting device that facilitates easy orientation of fixture elements, in example, vertical positioning of outlets and/or horizontal positioning of inlets of a plumbing valve fixture in a shower stall with tub.

A further object of the invention is to provide a fixture mounting device, the elements of which maximize space for access to the associated fixture, in situ.

Yet another object of the invention is to provide a fixture mounting device that is simple and inexpensive manufacture.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for equidistant bracketing of fixtures comprising: Bracket rails, Axles, Mounting bracket, and Fixture clamp assembly.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a front perspective view of the invention.
FIG. 2 is a side perspective view of the invention.
FIG. 3 is a top perspective view of the invention.
FIG. 4 is a front perspective view of the invention disposed between supports.
FIG. 8 is an exploded view of mounting bracket and associated elements.
FIG. 9 is a front perspective view of a mounting bracket and associated elements.

LIST OF COMPONENTS

Figure 5:
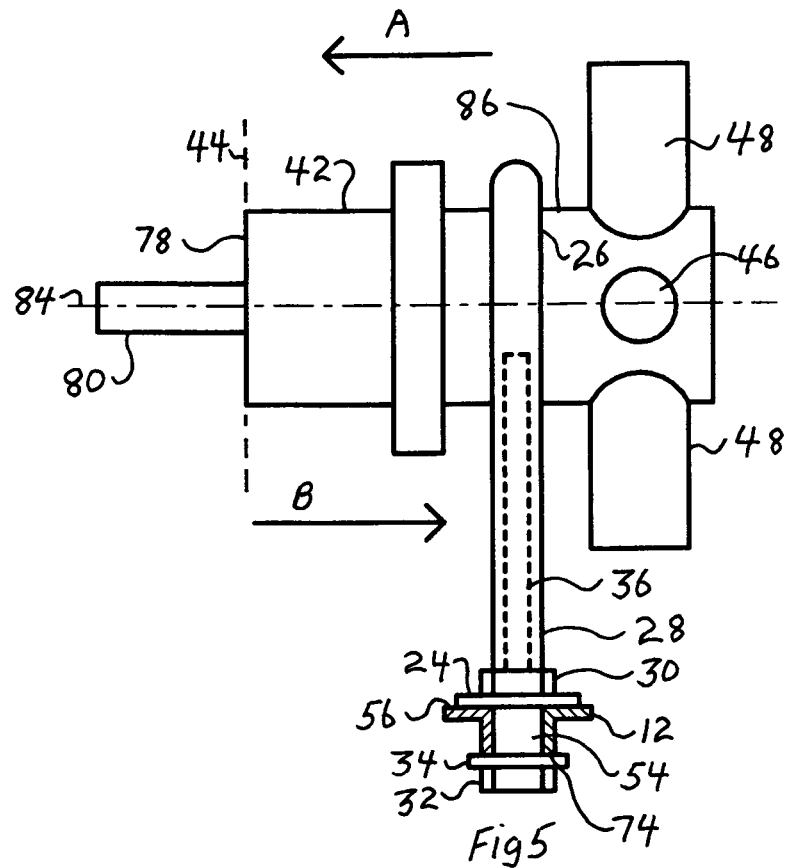
FIG. 5 is a side view of an element of the device communicating with a fixture.

10 Fixture bracket
12 Bracket rail
14 Axle
16 Mounting bracket
18 Mounting bracket flange
20 Mounting bracket flange hole
22 Fixture clamp assembly
24 Fixture clamp assembly plate
26 Fixture clamp
28 Fixture clamp leg
30 Fixture clamp upper nut
32 Fixture clamp lower nut
34 Fixture clamp washer
36 Fixture plate
38 Fixture seat
40 Fixture bracket mid point
42 Fixture
44 Wall position
46 Fixture inlet
48 Fixture outlet
50 Spacer
52 Stud
54 Bracket slot
56 Bracket rail face
58 Bracket rail end
62 Fixture clamp plate assembly plate hole
64 Threaded portion
66 Mounting bracket hole
68 Spacer channel
70 Fixture clamp assembly plate upper surface
72 Fixture clamp assembly plate lower surface
74 Bracket rail lower surface
76 Opposing stud faces
78 Fixture face
80 Fixture stem
84 Fixture axis
86 Fixture body
A Direction of slide
B Direction of slide
C Direction of rotation
D Direction of rotation

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In the descriptions of the embodiments of the instant art, it will be seen that said art comprises elements and processes such as washers, nuts, threaded elements, attachment of one surface to another by connective devices, and the like, all of which are long well known in the art; therefore, their manner of function in the instant art will not be meticulously detailed.

Looking now at FIG. 1, FIG. 2, and FIG. 3, we see a fixture bracket (10) having elongate bracket rails (12) with substantially planar faces (56) and lower surfaces (74) oriented such that said faces (56) are essentially co-planar and comprise a bracket slot (54). Said rails also have opposite ends (58). Proximal to said ends (58) are axles (14) oriented substantially perpendicularly to the rails (12). The axles (14) pass over the bracket slot (54) and support substantially L-shaped mounting brackets (16), which comprise flanges (18), and spacers (50). Also, the axles (14) are attached to the rails (12) by any of sundry means well known in the art, in example by welding, thusly holding the bracket rails (12) in a fixed orientation.

Looking now at FIG. 8, exploded view of elements, and FIG. 9, we note that the substantially L-shaped mounting bracket (16) comprises a hole (66) near the top of the mounting bracket (16) through which an axle (14) may pass with minimum clearance necessary for the mounting bracket (16) to be rotatable about said axle (14) or for said axle (14) to be rotatable relative said mounting bracket (16). In addition, we see that the spacer (50) comprises a substantially coaxial annular channel (68) with diameter such that the axle (14) may pass there-through with minimum clearance. In addition, we recognize that the substantially L-shaped mounting bracket flange (18) comprises mounting holes (20).

Returning attention to FIG. 1, FIG. 2, and FIG. 3, we see that axles (14) pass through the mounting brackets (16) and the spacers (50) such that the mounting brackets (16) may rotate about the axles (14) or vice versa, as indicated by arrows, while the spacers (50) restrict the mounting brackets (16) to essentially one location relative to each axle (14).

Figure 7:
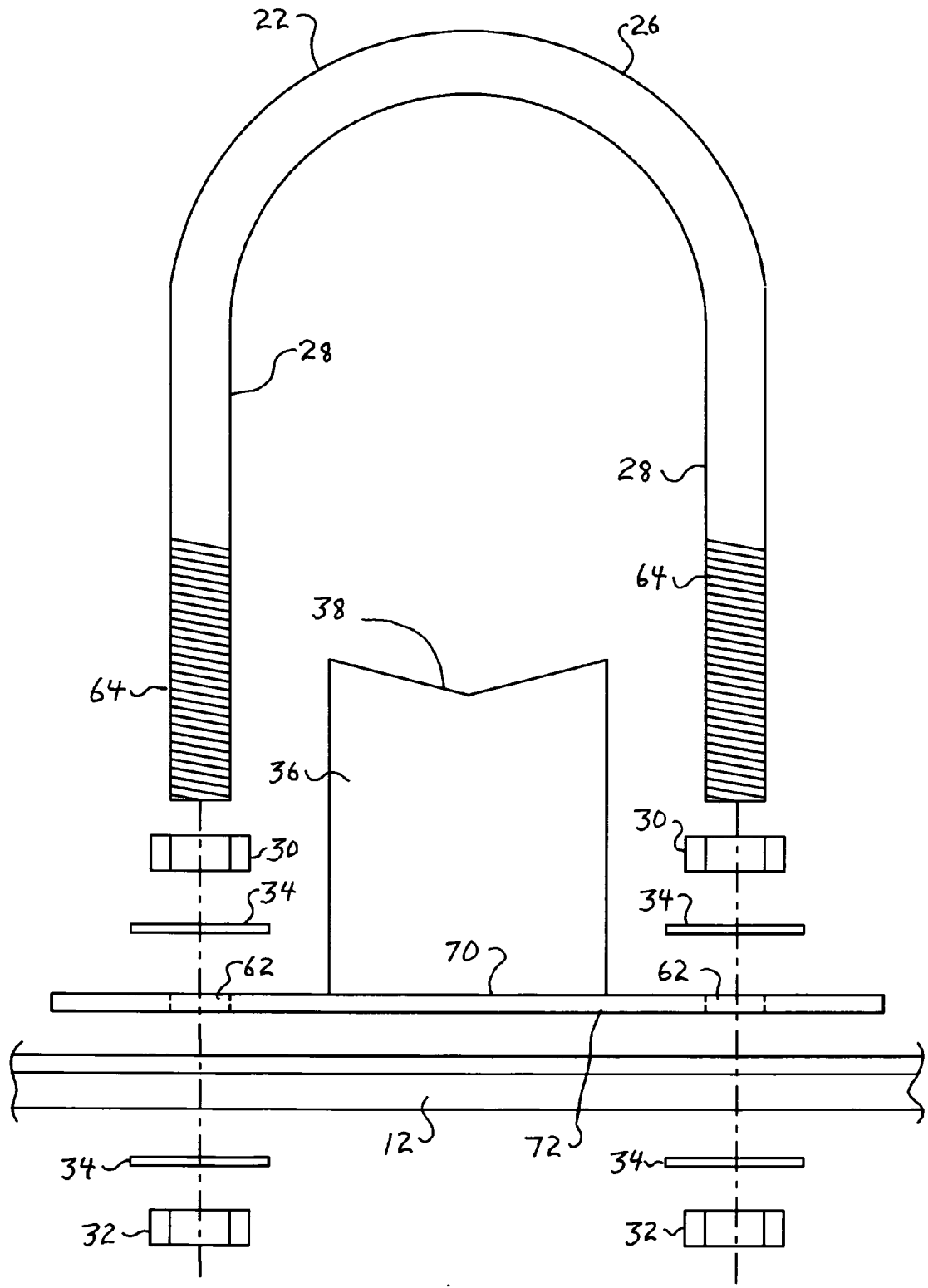
FIG. 7 is an exploded view of the elements of a fixture clamp assembly.

Looking now at FIG. 7, we see a fixture clamp assembly (22), with elements shown in exploded configuration, comprising a substantially U-shaped fixture clamp (26) having legs (28) comprising threaded portions (64). Also, we note a substantially planar fixture clamp assembly plate (24) having assembly holes (62) and an upper surface (70) and a lower surface (72) positioned substantially perpendicularly to the fixture clamp (26). Extending substantially vertically from the fixture clamp assembly plate (24), is an essentially planar fixture plate (36) comprising a fixture seat (38). This fixture seat (38) is shown in the form of a notch, but we may readily appreciate that other forms such as arcs may function equally well. Positioned between the fixture clamp legs (28) and the fixture clamp assembly plate upper surface (70) are fixture clamp upper nuts (30) which engage the threaded portions (64) of the fixture clamp legs (28) and which may be advanced up or withdrawn down the said threaded portion (64) by rotation in one direction or the other. Disposed between the fixture clamp upper nuts (30) and the fixture clamp plate upper surface (70) may be fixture clamp washers (34). Further, we additionally notice fixture clamp lower nuts (32) positioned below the fixture clamp assembly plate lower surface (72) and fixture clamp washers (34) disposed between the fixture clamp lower nuts (32) and the fixture clamp assembly plate lower surface (72). Those well versed in the art will realize that although the use of washers (34) accrues well known benefits, the device (10) can function without them. In addition, we see, disposed between the fixture clamp plate lower surface (72) and the washers (34) and/or lower nuts (32), a bracket rail (12).

Attending now to FIG. 1, FIG. 2, FIG. 3, and FIG. 7, we note that the fixture clamp upper nuts (30) may be threaded onto the threaded portions of the fixture clamp legs (28) a sufficient distance that when a portion of said legs (28) extends through fixture clamp washers (34), the fixture clamp assembly plate holes (62) and the bracket slot (54), a portion of the fixture clamp legs (28) will extend beyond the bracket rail lower surfaces (74) where the fixture clamp lower nuts (32) may be threaded onto said fixture clamp leg (28) portions. In addition, we note that when the fixture clamp legs (28) extend through the bracket slot (54), the fixture clamp (26) and the fixture plate (36) are substantially co-planar We also note that, at the same time, the fixture clamp assembly plate (24) will rest upon the bracket rail faces (56) and fixture clamp washers (34) will be sandwiched between the fixture clamp upper nuts (30) and the fixture clamp assembly plate upper surface (70) where said washers (34) function beneficially as is well known in the art or as in FIG. 1, FIG. 2, and FIG. 3 where washers (34) between the upper nuts (30) and the fixture clamp plate upper surface (70) are eliminated.

Now, we may readily appreciate that when the fixture clamp lower nuts (32) are rotated such that they advance onto the fixture clamp legs (28), washers (34) are sandwiched between the fixture clamp lower nuts (32) and the bracket rail lower surfaces (74) where said washers function beneficially as is well known in the art. Also, one can see that as the fixture clamp lower nuts (32) are advanced, pressure is created between the said lower nuts (32), the washers (34), and the fixture clamp upper nuts (30) thus sandwiching the fixture clamp assembly plate (24) and the bracket rails (12) there between.

We may additionally readily appreciate, that said force may be sufficient to cause friction between the fixture clamp assembly plate (24) and the bracket rails (12), this friction locking the fixture clamp assembly plate (24), and thus the fixture clamp assembly (22) in place relative to the bracket rails (12). Alternatively, we may understand that by manipulation of the position of the assembly clamp lower nuts (32) relative the assembly clamp legs (28), said friction may be minimized enough to allow the fixture clamp assembly (22) to slide relative the bracket rails (12) in direction A or direction B as indicated by arrows in FIG. 1 and FIG. 3.

Looking now at FIG. 4, we see two spaced apart studs (52) disposed substantially vertically in a fashion well known in the building arts, said studs having opposing faces (76). Also, we see that one mounting bracket flange (18) may be attached to one stud face (76) by any of sundry, well known means, in example by fasteners (not shown) passed through the mounting bracket flange holes (20) (not seen in FIG. 4). In addition, we note that when said mounting bracket flange (18) is thusly attached to one stud face (76), the bracket rails (12) connected by the axles (14) as previously described, may rotate, also as previously described, relative the mounting bracket (16) such that the mounting bracket flange (18), similarly disposed at the opposite ends (58) of the bracket rails (12), may be brought in contact with the opposing stud face (76) by rotating the mounting bracket (16) relative the axle (14), as previously described. Said mounting bracket flange (18) may then be attached to said opposing stud face (76) by means well known in the art.

Now, we may readily appreciate that the fixture bracket (10) may be mounted between two studs (52) and that, due to the rotatability of the mounting brackets (16) relative the axles (14) and vice versa, said fixture bracket (10) may be mounted between any studs (52) variously spaced without modification of the fixture bracket (10).

Looking yet again at FIG. 4, we note that the fixture clamp assembly (22) is slidable relative the bracket rails (12) as previously described. Further, we see that the bracket rails (12) comprise a mid point (40) which may be clearly marked, equidistant the ends (58) of the bracket rails (12). Further, we may readily appreciate that because the mounting brackets (16) and axles (14) are essentially congruent and the axles (14) are essentially equidistant the ends (58) of the bracket rails (12), we may prove by simple geometric principles that the bracket rails mid point (40) and a point equidistant the opposing studs (52) will coincide when the fixture bracket (10) is mounted as previously described. Additionally, we may also prove by geometry that the bracket rails mid point (40) and a point equidistant the opposing studs (52) will essentially coincide regardless of the distance between the studs (52) as long as said distance is small enough for the mounting bracket flanges (18) to contact the opposing stud faces (76).

Figure 6:
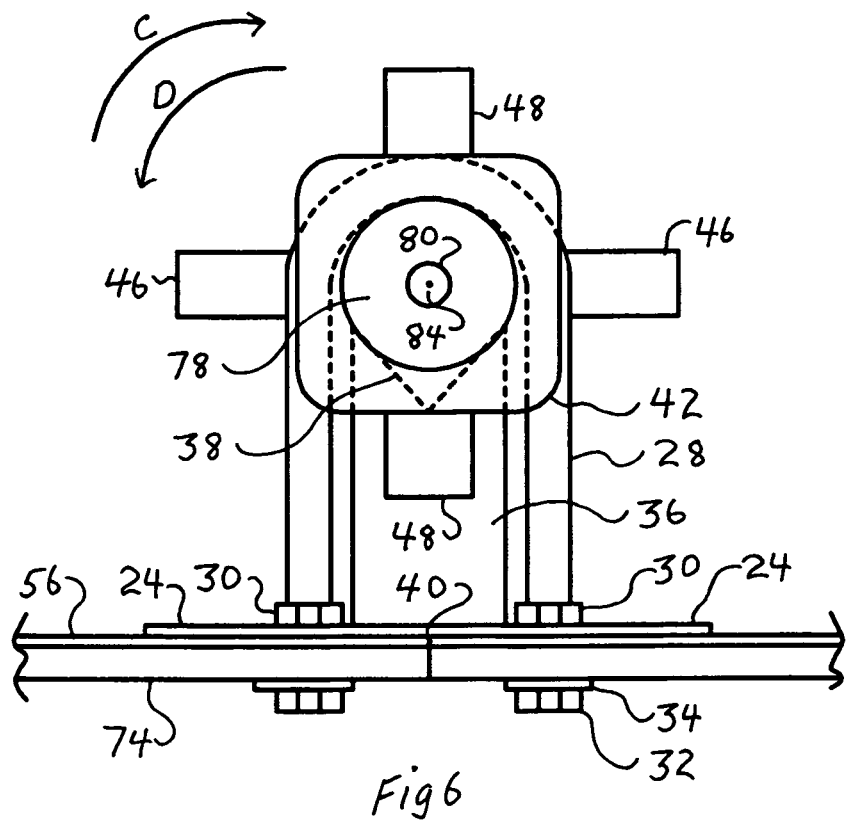
FIG. 6 is a front view of an element of the device communicating with a fixture.

Looking now at FIG. 5 and FIG. 6, we see a plumbing fixture (42) of a common type having a face (78), a stem (80), a body (86), an axis (84), fixture 22" inlets (46), and fixture outlets (48). Further, we note that the fixture clamp upper and lower nuts (30 and 32) may be manipulated such that the fixture body (86) may be positioned between the fixture clamp (26) and the fixture seat (38). Now we may readily appreciate that said nuts (30 and 32) may be positioned such that when the fixture clamp lower nuts (32) are rotated such that said nuts (32) advance toward the bracket rails (12), friction may be created between the fixture clamp (26), the fixture (42), and the fixture seat (38) sufficient to create enough friction to hold said fixture (42) fast. We may also readily appreciate that the fixture clamp upper and lower nuts (30 and 32) may also be manipulated such that the friction between the fixture clamp (26) fixture seat (38) and fixture body (86) may be adjusted to orientation of the fixture to be adjusted relative the fixture clamp assembly (22).

An example is provided in FIG. 5 where we see that the fixture (42) is slidable in direction A or direction B, as indicated by arrows, that is to say, essentially perpendicularly to the fixture clamp (26). Thus, the face (78) of the fixture (42) may be positioned as required, in example, flush with the position (44) of a wall surface that may be subsequently installed such that the stem (80) may extend beyond said wall surface position (44) such that knobs or the like may be attached for manual adjustment of the fixture (42).

Looking again at FIG. 5 and FIG. 6, we also see that the fixture clamp upper and lower nuts (30 and 32) may be adjusted such that the friction between the fixture body (86), fixture seat (38), and fixture clamp (26) allow the fixture (42) to be rotated on its axis (84) thereby allowing elements of the fixture (42) to be orientated as desired, relative to the vertical and/or horizontal. In example, as in FIG. 6 we see a plumbing fixture of a common type having inlets (46) and outlets (48) disposed essentially 90 degrees apart rotated in direction C and/or direction D, as indicated by arrows, to dispose the outlets (48) substantially vertically and the inlets (46) substantially horizontally.

Turning again to FIG. 4 and FIG. 6, we may readily appreciate that the fixture clamp assembly (22) with fixture (42) may be moved relative the bracket rails (12) and then fixed fast in position such that a point on the fixture axis (84) and the fixture rail mid point (40) will comprise a vertical. Further, we may understand that the fixture clamp assembly (22) may be positioned relative the bracket rails (12) at sundry other points desired or required.

Looking yet again at FIG. 1, FIG. 2, FIG. 3, FIG. 4, FIG. 5, and FIG. 6, we see that the elements comprising the fixture bracket (10) comprise minimal dimensions such that a workman might easily access any element of the fixture (42) and thus execute without impediment any procedure necessary to install said fixture (42). In addition, we may understand that use of the instant art is not limited to fixtures (42) of the type described but may be exploited with many types. Nor is the instant art limited to furtherance of the plumbing arts but may be employed with electrical devices or any other device that must be fixed between supporting structures.

We may also readily appreciate that when fixtures (42) of known dimensions are to be oriented between studs (52) of known spacing at a known point between the two, the fixture (42) may be positioned and fixed fast in the fixture bracket (10) before the fixture bracket (10) is mounted between the studs (52).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for mounting of fixtures comprising:
bracket rails;
axles;
mounting brackets; and
fixture clamp assembly
wherein the bracket rails comprise substantially planar upper surfaces, lower surfaces, and ends;
wherein the axles attach to the bracket rails upper surfaces proximal said ends, substantially perpendicularly to said ends, fixing said bracket rails substantially parallel and in such a position as to form a bracket slot between the bracket rails upper and lower surfaces and;
wherein said mounting brackets comprise substantially congruent configurations having planar surfaces, comprising portals through which the axles pass, such that said mounting brackets rotate about said axles and the said axles rotate in the mounting brackets, and
such that said mounting brackets comprise substantially planar flanges extending substantially perpendicularly from said planar surfaces, said flanges having holes; and
wherein said fixture clamp assembly comprises a substantially U-shaped fixture clamp having legs with threaded portions proximate to the ends of the said legs, and upper nuts having threads that communicate with said threaded portions, such that said nuts are attachable to and removable from the said threaded portions; and
further comprising, a substantially planar fixture clamp plate having holes through which the legs pass, and a substantially planar fixture plate, extending essentially vertically from said planar fixture clamp plate, the said fixture plate comprising a fixture seat upon which a fixture may rest,
the fixture clamp and the fixture plate being essentially co-planar when said fixture clamp legs are extended through said fixture clamp plate holes and through the bracket slot,
wherein said fixture clamp plate rests upon said bracket rails upper surfaces, the fixture clamp legs having sufficient length that when the said fixture clamp plate rests upon said bracket rails upper surfaces, the said fixture clamp legs may be attached to the said bracket rails lower surfaces.

2. A machine as in claim 1 having spacers communicating with the axles and disposed between the bracket rails in such a manner as to fix the positions of mounting brackets relative the bracket rails.

3. A machine for mounting of fixtures comprising:
bracket rails;
axles;
mounting brackets; and
fixture clamp assembly
wherein the bracket rails comprise substantially planar upper surfaces, lower surfaces, and ends;
wherein the axles attach to the bracket rails upper surfaces proximal said ends, substantially perpendicularly to said ends, fixing said bracket rails substantially parallel and in such a position as to form a bracket slot between the bracket rails upper and lower surfaces and;
wherein said mounting brackets comprise substantially congruent configurations having planar surfaces, comprising holes therein of a minimum diameter required for the axles to pass there-through, such that said mounting brackets rotate about said axles and the said axles rotate in the said mounting brackets, and such that said mounting brackets comprise substantially planar flanges extending substantially perpendicularly from said planar surfaces, said flanges having holes; and wherein said fixture clamp assembly comprises a substantially U-shaped fixture clamp having legs with threaded portions proximate to the ends of the said legs, and upper nuts having threads that communicate with said threaded portions, such that said nuts are attachable to and removable from the said threaded portions; and further comprising, a substantially planar fixture clamp plate having holes through which the legs pass, and a substantially planar fixture plate, extending essentially vertically from said planar fixture clamp plate, the said fixture plate comprising a fixture seat upon which a fixture rests, the fixture clamp and the fixture plate being essentially co-planar when said fixture clamp legs are extended through said fixture clamp plate holes and through the bracket slot, wherein said fixture clamp plate rests upon said bracket rails upper surfaces, the fixture clamp legs having sufficient length that when the said fixture clamp plate rests upon said bracket rails upper surfaces, the said fixture clamp legs extend below said bracket rails lower surfaces far enough that lower nuts having threads that communicate with the said extending fixture clamp legs, and such that the said lower nuts are rotationally adjustable relative the said extending fixture clamp legs, thereby adjusting the extending fixture clamp legs.

4. A machine as in claim 3 having spacers communicating with the axles and disposed between the bracket rails in such a manner as to fix the positions of mounting brackets relative the bracket rails.

\* \* \* \* \*